United States Patent
Ali et al.

(10) Patent No.: US 8,712,435 B2
(45) Date of Patent: Apr. 29, 2014

(54) METHODS AND APPARATUS TO PERFORM TIME ZONE DETERMINATION BY A MOBILE STATION

(75) Inventors: Syed Hussain Ali, Waterloo (CA);
Dominik Buszko, Weston, FL (US);
Noushad Naqvi, Waterloo (CA);
Maiyuran Wijayanathan, Waterloo (CA); Jigar Shah, Coral Springs, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/615,058

(22) Filed: Sep. 13, 2012

(65) Prior Publication Data

US 2013/0005337 A1 Jan. 3, 2013

Related U.S. Application Data

(62) Division of application No. 12/889,073, filed on Sep. 23, 2010, now Pat. No. 8,290,489.

(60) Provisional application No. 61/245,661, filed on Sep. 24, 2009.

(51) Int. Cl.
*H04W 88/02* (2009.01)

(52) U.S. Cl.
USPC .................................... 455/456.1

(58) Field of Classification Search
USPC ........... 455/456.1, 456.3, 35.1; 709/203, 204, 709/224; 711/170; 726/1, 22, 30
See application file for complete search history.

(56) References Cited

U.S. PATENT DOCUMENTS

| | | |
|---|---|---|
| 2002/0191492 A1 | 12/2002 | Kampter et al. |
| 2004/0137913 A1 | 7/2004 | Masuda |
| 2004/0203848 A1 | 10/2004 | Kumar |
| 2004/0224704 A1 | 11/2004 | Islam et al. |
| 2005/0232086 A1 | 10/2005 | Jiddou et al. |
| 2007/0049250 A1* | 3/2007 | Chambers et al. ............ 455/411 |
| 2008/0032736 A1 | 2/2008 | Bari et al. |
| 2008/0137619 A1 | 6/2008 | Chun |
| 2009/0219205 A1 | 9/2009 | Jazra et al. |
| 2010/0291907 A1 | 11/2010 | MacNaughtan et al. |
| 2011/0201346 A1 | 8/2011 | Schroeder et al. |
| 2012/0058776 A1* | 3/2012 | Ligeret ...................... 455/456.1 |
| 2012/0064891 A1 | 3/2012 | Wijayanathan et al. |

FOREIGN PATENT DOCUMENTS

| | | |
|---|---|---|
| EP | 1715702 | 10/2006 |
| WO | 2007096685 | 8/2007 |

OTHER PUBLICATIONS

3GPP TSG CT Meeting #49, Add Timezone IE in Location Update Request, 3GPP Draft; CP-100524 (was C1-103569) 3rd Generation Partnership Project (3GPP), Sep. 15, 2010, (3 pages).

(Continued)

*Primary Examiner* — Diane Mizrahi
(74) *Attorney, Agent, or Firm* — Hanley, Flight & Zimmerman. LLC

(57) ABSTRACT

This application pertains to methods and apparatus to perform time zone determination by a mobile station. One example method for use in a device includes transmitting a messaging service message to a server via a communication network, the messaging service message to be used to determine a time zone for the device, and receiving the time zone for the device from the server. Other examples are shown and described.

21 Claims, 8 Drawing Sheets

(56) References Cited

OTHER PUBLICATIONS

NEC: Discussion on Timezone Info in MM Information Procedure, 3GPP Draft; C1-103166, 3rd Generation Partnership Project (3GPP) Mobile Competence Centre; 650, Rout Des Lucioles; F-006921 Sophia-Antipolis Cedex; France, Aug. 23, 2010, (5 pages).

International Searching Authority, International Search Report, issued in connection with PCT/US2010/050020, mailed Dec. 7, 2010, (4 pages).

International Searching Authority, Written Opinion, issued in connection with PCT/US2010/050020, mailed Dec. 7, 2010, (8 pages).

International Searching Authority, International Preliminary Report on Patentability, issued in connection with PCT/US2010/050020, mailed Apr. 5, 2012, (9 pages).

United States Patent and Trademark Office, "Notice of Allowance", issued in connection with U.S. Appl. No. 12/889,073, Jul. 23, 2012, (17 pages).

United States Patent and Trademark Office, "Office action", issued in connection with U.S. Appl. No. 12/889,073, May 10, 2012, (42 pages).

United States Patent and Trademark Office, "Office action", issued in connection with U.S. Appl. No. 12/889,073, Mar. 30, 2012, (10 pages).

Canadian Intellectual Property Office, "Office Action" issued in connection with corresponding Canadian Patent Application No. 2,775,127 on Feb. 6, 2014 (2 pages).

\* cited by examiner

METHODS AND APPARATUS TO PERFORM TIME ZONE DETERMINATION BY A MOBILE STATION

RELATED APPLICATIONS

This patent arises from a divisional of U.S. patent application Ser. No. 12/889,073, filed on Sep. 23, 2010 (now U.S. Pat. No. 8,290,489, issued Oct. 16, 2012), which claims the benefit of U.S. Provisional Application No. 61/245,661, filed 24 Sep. 2009, the entireties of which are incorporated by reference herein.

FIELD OF THE DISCLOSURE

This disclosure relates generally to mobile communications and, more particularly, to methods and apparatus to perform time zone determination by a mobile station.

BACKGROUND

Network identification and time zone (NITZ) is a cellular network feature that provides time information to a mobile station (MS). In 2 G and 3 G networks, NITZ is accomplished by sending messages including time information to the MS. However, the messages including time information are optional. Accordingly, it may be impossible for a MS to correctly set its time.

DETAILED DESCRIPTION

Figure 1:
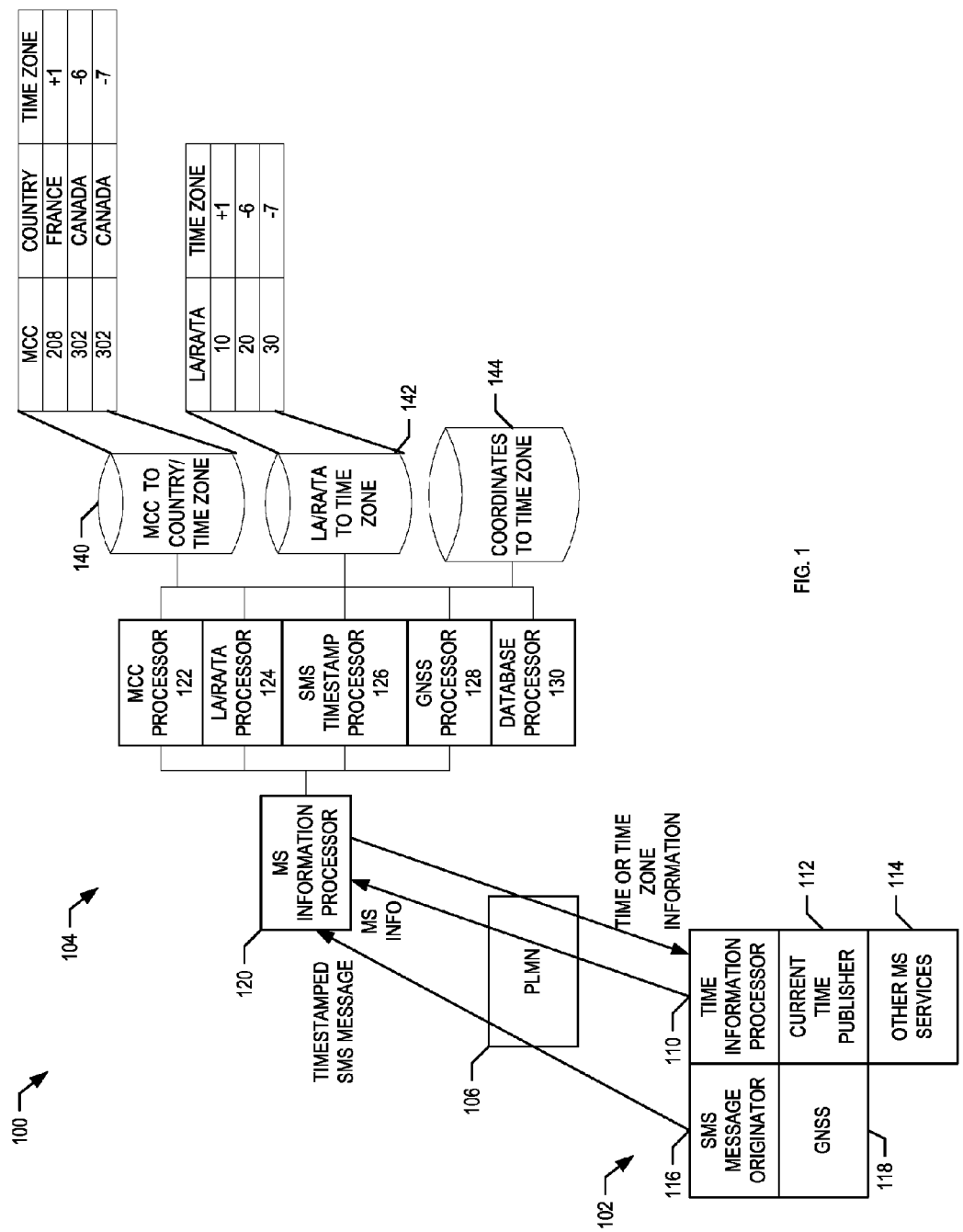
FIG. 1 is a block diagram of an example communication system including portions of a mobile station (MS) and a time server.

The 3GPP specification supports a core network feature commonly known as Network Identity and Time Zone (NITZ). According to this feature, networks optionally send network name and time information (i.e., universal time, local time zone offset, and a flag to signal whether the local time zone offset has been adjusted for daylight saving time) to a mobile station (MS). The information is sent in MM INFORMATION (for circuit switched services) and/or GMM INFORMATION (for packet switched services) by the core network in 3GPP. In Evolved Packet Core/Long Term Evolution (EPC/LTE) networks, an EMM INFORMATION message is used for this purpose. With the help of the information sent in the NITZ procedure, the MS is able to set its time correctly.

In 2 G and 3 G networks, NITZ is accomplished by sending MM INFORMATION (circuit switch domain) and GMM INFORMATION (packet switch domain) messages in the downlink. In EPC/LTE networks, the EMM INFORMATION message accomplishes the NITZ objectives. These three messages contain time related information like universal time and local time zone, and a flag to signal that local time offset includes daylight saving settings. This message and the time related information elements are optional. Therefore, it is possible that cellular networks do not provide this information to the MS. In fact, most of the networks and infrastructures do not support the optional feature of NITZ. Even if they support NITZ, it has been observed that in most of the cases NITZ implementation lacks the time information in the MM/GMM INFORMATION messages.

For correct time determination, there are three information elements which are required. These information elements are: universal time, local time zone, and daylight saving settings for the time zone. The local time zone translates into an offset with respect to the universal time. It is possible to maintain the database of local time zone offset and daylight saving settings for every time zone of the world in the MS or in any other entity like a time server. Using GPS/AGPS/GNSS or relevant location tracking technologies, MS can determine its geographical location, such as geographical coordinates, and the universal time. The geographical coordinates can be easily translated to local time zone. Thus, all the three information elements are available to determine the correct MS time.

An alternative to the location tracking technologies is an inexpensive solution where a user is required to provide correct local time zone information to the MS. MS in return contacts a time server on the Internet that maintains current universal time (i.e., Greenwich Mean Time (GMT)). Using the daylight saving database, the MS or the time server calculates the correct time. The information transfer between time server and MS can take place through circuit switch, packet switch, SMS, or any transport mechanism.

The correct local time setting is important for the user experience. Several applications (i.e., MS services) rely on the correct time information otherwise they cannot operate as expected. For example, applications other than applications used to determine geographical location or coordinates, such as a calendar application requires time to display a calendar, set or change new or existing appointments and correctly remind the user of upcoming appointments. Similarly E-mail, MMS, SMS, instant messaging (IM), and social networking need correct time stamps. The correct time is even more critical in the enterprise market where users frequently travel across time zones. The need of correct time setting will further increase with the popularity of smart phones and the development of innovative applications.

The example solutions described herein enable a MS to learn of its time zone in manners that are independent of communication standards and do not require any changes in the 3GPP specifications. These solutions are applicable in situations when cellular networks do not transfer time information to MS in NITZ. Furthermore, users are also not required to configure the correct time zone on their MS. The first solution relies on location tracking technologies like GNSS/GPS/AGPS to determine MS geographical coordinates and correct universal time. This determination could be performed independently or in cooperation with a location server. Further, this solution propagates the MS time to services and applications such as calendar, SMS, E-mail and others operating in the MS.

Another solution relies on the time server to provide universal time, time zone offset and daylight saving settings of all time zones. This solution relies on a hierarchy wherein, in a first attempt to determine local time at the MS, the MCC is used to determine time zone. If the MCC cannot be used to uniquely determine the time zone, a Location Area Identity (LAI) registry or SMS time stamp may be used to determine the time zone. If none of those solutions provide the time zone information, GNSS information may be used to determine the geographic location of the MS and, from that information, the time zone may be determined The time server also maintains universal time and daylight saving setting for each time zone.

In FIG. 1, a block diagram of an example communication system 100 including a mobile station (MS) 102 and a time server 104, each of which is implemented as described herein to support time zone determination by the MS. According to an illustrated example, the MS 102 provides information, via a network, such as a public land mobile network (PLMN) 106, to the time server 104 and the time server 104 processes the MS information to determine either local time for the MS 102 or the time zone in which the MS 102 is located. It provides the local time to the MS 102 or provides time zone offset, daylight saving flag and universal time information to the MS 102 so that the MS 102 can determine the local time based on this information. Subsequently, the MS 102 can use the time or time zone information including universal time and daylight saving flag to update the time and time zone information that are used by various services within the MS 102.

While FIG. 1 shows the MS 102 connected only to the time server 104 through the PLMN 106, such an illustration is simplified for the purposes of clarity and does not show additional network components or entities that may be present in certain example implementations. The PLMN 106 may be a home PLMN (HPLMN) of the MS 102, or may be a visiting PLMN (VPLMN) of the MS 102. Additionally, the PLMN 106 may be implemented as part of a 3GPP network or it could be any generic network, such as Wireless LAN, WiFi, or WiMAX.

The MS 102, which is shown in a simplified manner to set forth the time processing aspects thereof, may be a 3GPP-compliant device implemented as a single unit such as a data communication device, a cellular telephone, a multiple-function communication device with data (e.g., electronic mail, internet access, personal information management, etc.) and voice communication capabilities, a personal digital assistant (PDA) enabled for wireless communication, a smart telephone, or a computer incorporating an internal modem. Alternatively, the MS 102 may be a multiple-module unit comprising a plurality of separate components, including but in no way limited to a computer or other device connected to a wireless modem. Though not shown in FIG. 1, the MS 102 may include RF transceiver circuitry and antenna(s) that may be implemented as a radio modem unit that may be inserted into a port on a laptop computer. In this case, the laptop computer would include a display, a keyboard, one or more auxiliary user interfaces, and the controller may be the computer's central processing unit (CPU).

The MS 102 includes a time information processor 110, a current time publisher 112, other MS services 114, an SMS message originator 116, and a GNSS processor 118. These components may be implemented using dedicated hardware, programmed instructions stored in computer readable memory that are executed by hardware, programmed processors, any form of logic, or any combination thereof.

As described in detail below in conjunction with the accompanying flow diagrams, the time information processor 110 sends information that is used by the time server 104 to determine the local time or time zone of the MS 102. The time information processor 110 also receives the time or time zone information, universal time and daylight saving flag from the time server 104. Based on the information provided by the time server 104, the time information processor 110 determines the local time and provides the same to the current time publisher 112.

The current time publisher 112 may be implemented as a software service that makes the current time and/or time zone available to other MS services or applications 114. Other MS services and applications 114 may include services that facilitate setting calendar appointments, e-mailing, task tracking, to-do lists, SMS time stamping, call logs, event logging, instant messages, social networking, and any other user and/or enterprise application may make use of the local time and time zone.

The GNSS processor 118 includes any suitable combination of hardware and/or software to enable the MS 102 to determine its global coordinates and universal time with the help of GNSS.

The time server 104 may be implemented as part of a cellular network, such as a 3GPP-compliant network or may be accessible in any other suitable manner, such as through Internet protocol (IP) communications. The time server 104 could be part of the PLMN or outside of the PLMN. The time server 104 includes an MS information processor 120 that is responsible for receiving information from the MS 102 and sending information to the MS 102. Information received at the MS information processor 120 from the MS 102 is forwarded to one or more processors that process the information from the MS 102 to determine a local time or time zone (or both) based thereon.

As shown in FIG. 1, the time server 104 includes a mobile country code (MCC) processor 122, a location area identity (LAI)/routing area identity (RAI)/tracking area identity (TAI) processor 124, an SMS timestamp processor 126, a global navigation satellite system (GNSS) processor 128, and a database processor 130. These processors may be distinct as shown in FIG. 1, or may be integrated into one or more groups of processors. Additionally, the processors 122, 124, 126, 128, 130 may be implemented by dedicated hardware, software, or hardware executing software (such as a processor executing computer readable instructions).

The processors 122, 124, 126, 128, 130 are coupled to several databases, such as an MCC to country/time zone database 140, a LAI/RAI/TAI to time zone database 142, and a coordinates to time zone database 144. In one example, the databases also contain daylight saving settings for every time zone in the world. The databases may be physically separate databases located on different hardware pieces, or may be combined onto one or more pieces of hardware. A brief description of how the processors 122, 124, 126, 128, 130 interact with the databases 140, 142, 144 is now provided.

When the time server 104 receives MCC information from the MS 102, the MCC processor 122 accesses the MCC database 140. As shown in FIG. 1, the MCC database 140 stores a table correlating MCC to a country and to a time zone. Because most countries are covered by only one time zone, it is possible to determine the time zone of the MS 102 my examining the MCC, which is what the MCC processor 122 performs. For example, if the MCC is 1, the MCC database 140 indicates that the country corresponding to the MCC is France, which is a +1 time zone adjustment from Greenwich Mean Time (GMT). Thus, upon receiving a MCC of 1 from the MS 102, the MCC processor 122 of the time server 104 determines that the time zone of the MS 102 must be GMT+1. While most countries correspond to only one time zone, this is not always the case. For example, as shown in FIG. 1, Canada, which is represented by an MCC of 2, covers at least two time zones (GMT−6 and GMT−7). The MCC database 140 of FIG. 1 is shown in abbreviated format and does not show all time zones that may be used. For example, although a portion of data is shown indicating that Canada has two time zones, it should be noted that Canada has six time zones in all. Thus, in cases where a country spans more than one time zone, based on MCC alone, the time server 104 cannot determine in which time zone the MS 102 is located.

The LAI/RAI/TAI processor 124 handles the case when the MS information received at the time server 104 is LAI/RAI/TAI information. In particular, the LAI/RAI/TAI processor 124 accesses the LAI/RAI/TAI database 142, which stores data correlating a received LAI/RAI/TAI code to a time zone. Thus, based on LAI/RAI/TAI information provided by the MS 102, the time zone of the MS 102 may be determined The LAI/RAI/TAI also contains PLMN identity which includes MCC.

The SMS timestamp processor 126 operates in the case in which time server 104 receives an SMS message from the MS 102 when the MS 102 is seeking its local time or time zone. As described below in detail, because the SMS message was time stamped by the PLMN 106, the SMS message bears the local time of the SMS controller of the PLMN 106. Thus, the SMS timestamp processor 126 can determine the time zone of the SMS controller by mapping the local time received in the time stamp to the possible local times in the country where the MS 102 is registered. For example, if the SMS time stamp is +7 hours from the universal time, the SMS timestamp processor 126, which already knows the universal time, can easily map it to the Pacific Standard Time.

The GNSS processor 128 is used to process global positioning system (GPS) coordinates received from the MS 102. For example, if the time server 104 receives GPS coordinate from the MS 102, the GNSS processor 128 accesses the coordinates to time zone database 144, which determines the time zone for the MS 102 based on the global position of the MS 102. The MS 102 finds the universal time from the GNSS.

Flowcharts representative of example processes that may be executed to implement some or all of the elements of the system 100 and mobile communication devices described herein are described below and shown in the drawings.

In these examples, the process represented by each flowchart may be implemented by one or more programs comprising machine readable instructions for execution by: (a) a processor, such as the microprocessor 812 shown in the example computer system 800 discussed below in connection with FIG. 8, (b) a controller, (c) a mobile station such as the mobile station 102, (d) a server such as the time server 104 and/or (e) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the microprocessor 812 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of the MS 102 or may be implemented as a part of the time server 104, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 2:
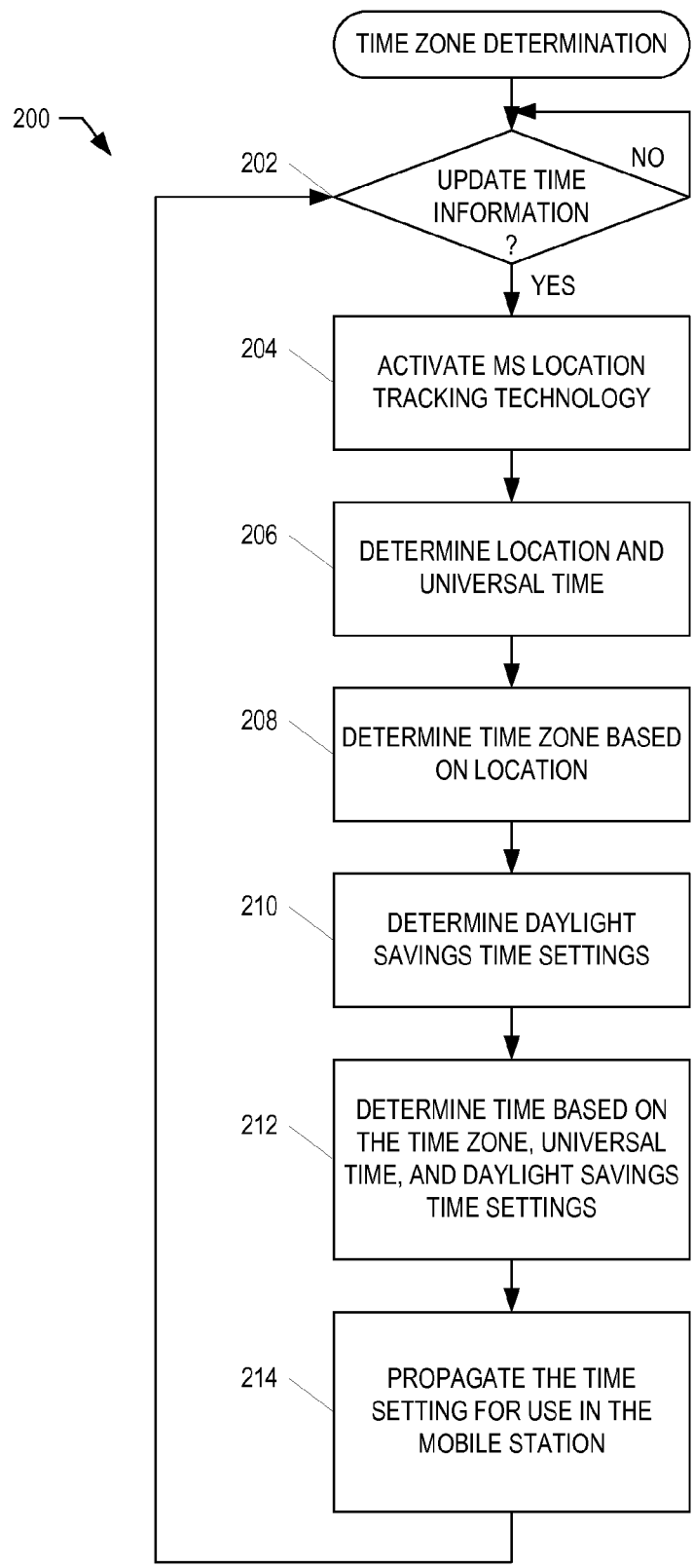
FIG. 2 is a flowchart of a first example time zone determination process that may be carried out at least partially by the example communication system of FIG. 1.

A first process to carry out time zone determination is shown in FIG. 2 at reference numeral 200. This process may be carried out completely by the MS 102, or may be carried out by the MS 102 in conjunction with other entities, such as the time server 104. As shown in FIG. 1, the MS 102 includes a GNSS processor 118, such as GPS/AGPS or other GNSS technologies. The MS 102 waits until it is time to update the time information of the MS 102 (block 202). The time information may be updated periodically or based on any trigger (e.g., power on, change of PLMN, change of location area/routing area/tracking area or any other suitable trigger). When it is time to update (block 202), the MS 102 activates the GNSS processor 118 (or any other MS location tracking technology) (block 204). The GNSS processor 118, more generally the MS 102, determines its geographical location or geographical coordinates and universal time (block 206). This determination could be performed independently or in assistance with a location server. If assisted technologies like AGPS/A-GNSS are used then the MS 102 and location server can communicate through any control plane or user plane protocols for location assistance and information transfer. Examples of control plane protocols are RRLP and RRC and user plane is SUPL. The proposed solution is not limited to the existing technologies and protocols. It can be used with any future technology and protocol.

Once the MS 102 knows its geographical coordinates and universal time, it can determine local time zone by translating the geographical coordinates into a time zone, such as a local time zone (block 208). The MS 102 then determines the daylight savings time settings of the MS 102 (block 210). The mapping of geographical coordinates to local time zone and daylight saving settings for the time zone offset could be preloaded in the MS 102 or downloaded to the MS 102 over the air or stored in a time server on the Internet and communicated to the MS 102 using circuit switch, packet switch, SMS download or alternative transport mechanisms. For the later case, MS 102 communicates its geographical coordinates to the time server using any of the transport mechanisms. Then, the MS 102 can determine the current time, which may also be referred to as a current local time, by adding/subtracting the time zone offset (e.g., a local time zone offset) into universal time and considering the daylight savings time setting (block 212). It is also possible that the MS local time is determined by the time server 104 and communicated to MS 102 over the transport mechanisms.

Having determined the current local time (block 212) using GNSS, the MS 102 uses this time in setting calendar appointments, electronic mail (E-mail), tasks, to-do list, SMS time stamping, call logs, event logging, instant messaging, social networking, and host of other user and enterprise applications (block 214).

Figure 3:
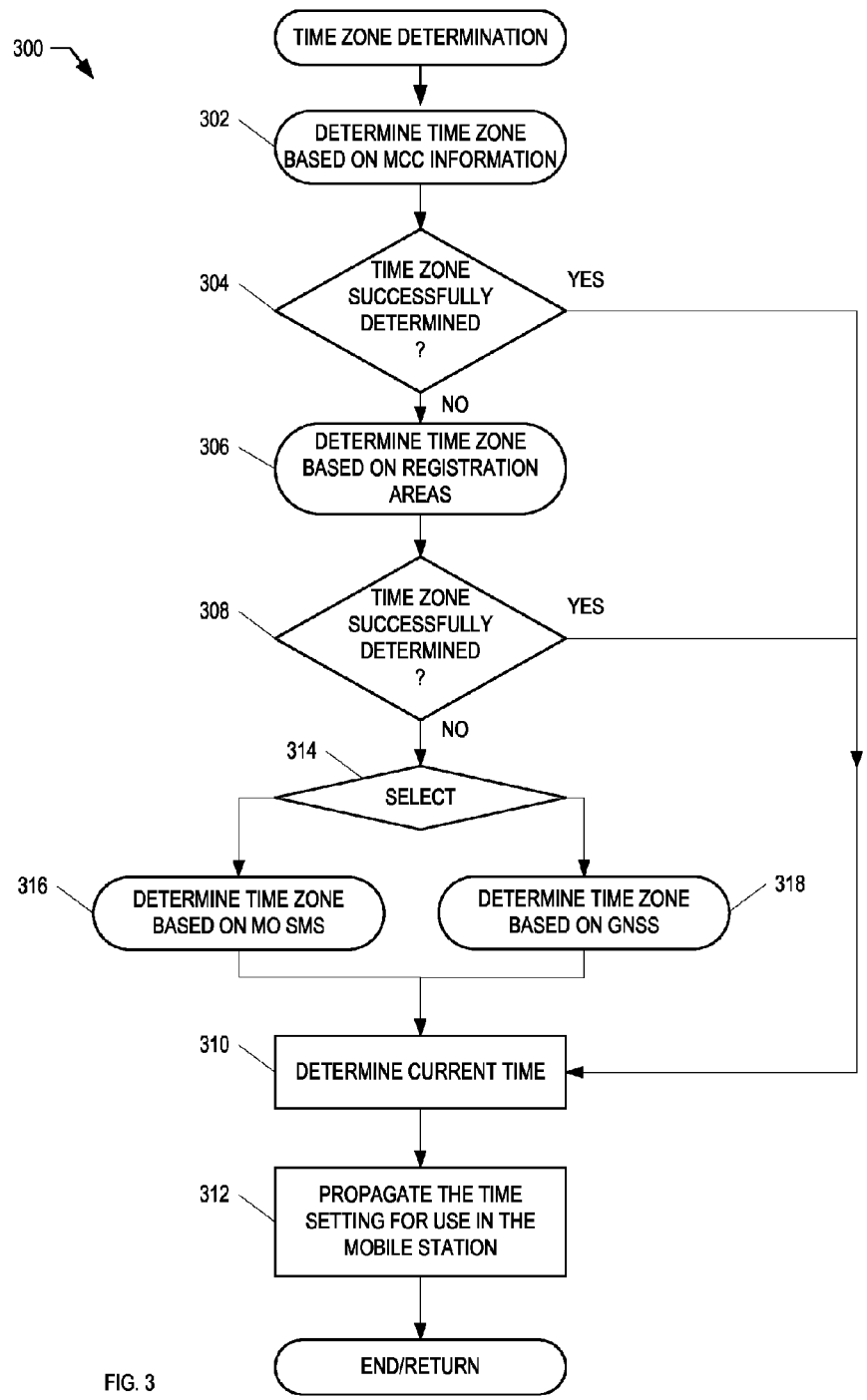
FIG. 3 is a flowchart of a second example time zone determination process that may be carried out at least partially by the example communication system of FIG. 1.

FIG. 3 shows an alternative approach to determining a time zone in which the MS 102 is located, via a process 300. The process 300 may be carried out by the MS 102 in conjunction with the time server 104. While certain aspects of FIG. 3 and its accompanying drawings, are described as being carried out by either the MS 102 or the time server 104, such descriptions are merely examples. For example, functionality attributed to the time server 104 in the description may be carried out by the MS 102 and vice versa.

The solution of FIG. 3 need only be used if cellular networks do not support transfer of time information to MS (e.g., through NITZ). According to the process 300, the MS 102 uses the help of the time server 104 to set the correct time of the MS 102. In the described example, the time server 104 maintains universal time, time zones, and daylight settings for all time zones of the world. The only information needed by the time server 104 is the local time zone of the MS 102. Once the time server 104 knows the time zone of the MS 102, the time server 104 can provide the local time or provide all the information to the MS 102 so that it can calculate its local time. The MS 102 and the time server 104 can communicate using any transport mechanisms, for example circuit switch data, packet switch data, or SMS transport. The process 300 of FIG. 3 is not limited by the underlying transport technology used to transfer information between the time server 104 and the MS 102. The time server 104 could be internal to a cellular network or outside of a cellular network (e.g., available on the Internet).

As described below, the process 300 of FIG. 3 uses different approaches to determine time zone information for the MS 102. In general, the process 300 first attempts to determine time zone information using MCC information (block 302). If that is not successful (block 304), the process 300 attempts to determine time zone information based on registration area information or codes like the location area/routing area/tracking area (block 306). If either of these attempts is successful (blocks 304 or 308), the process determines the time (e.g., the local time) based on the time zone, universal time, and daylight savings information (block 310) and propagates the current time setting for use by various applications and services within the MS 102 (block 312).

In contrast, if the determinations of time zone have been unsuccessful based on MCC information and registration area information, the process makes a selection (block 314) between making a time zone determination based on a mobile originated SMS message (block 316) or making a time zone determination based on GNSS information (block 318). Either of these approaches will result in time zone information that will allow determination of the current time (block 310). The selection (block 314) may be based on processing availability on the MS 102, the availability of functionality, such as GNSS functionality, or any other suitable considerations.

Each of the determinations described above in conjunction with blocks 302, 306, 316, and 318 is described below in detail in conjunction with FIGS. 4-7, respectively.

Figure 4:
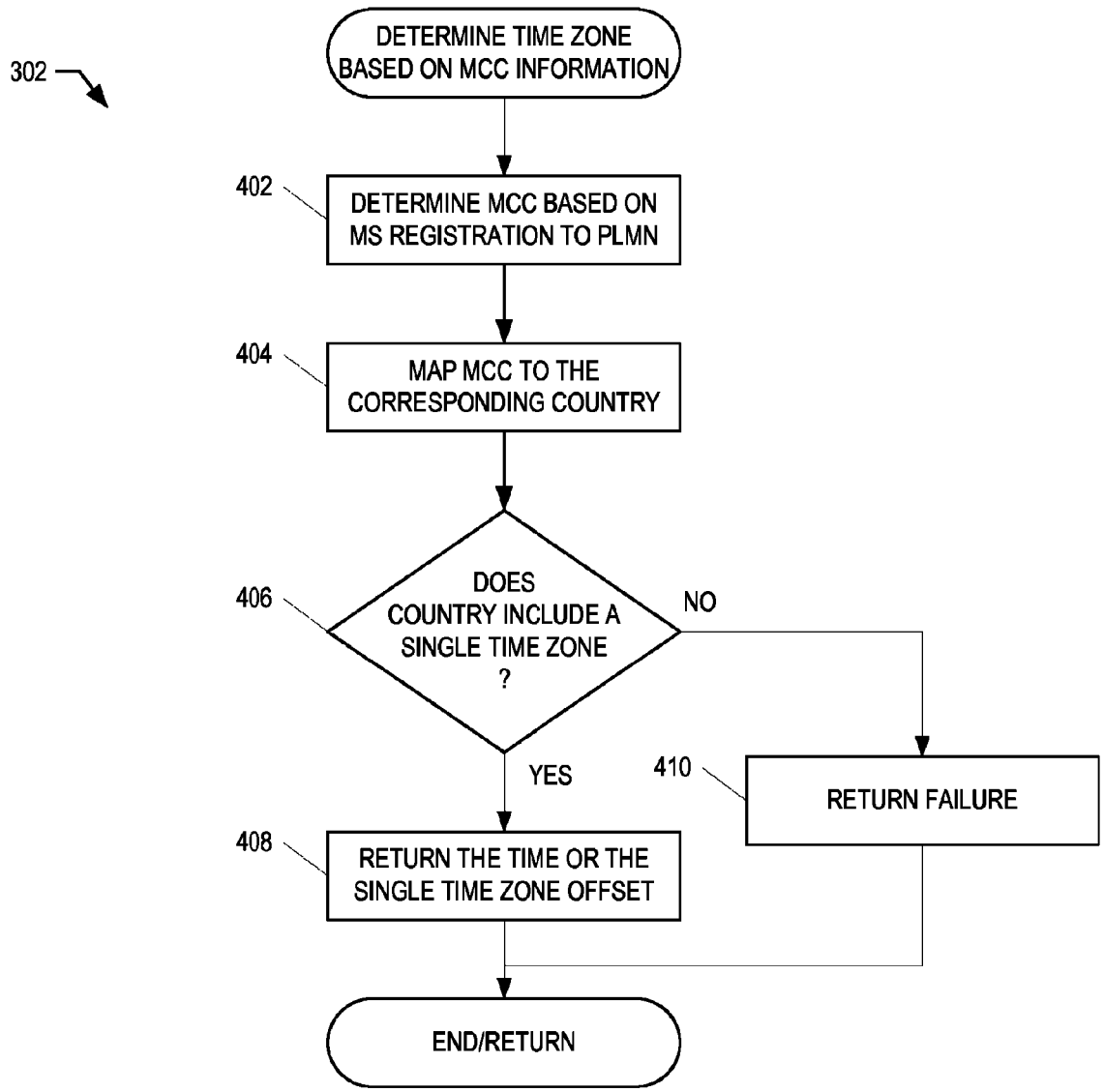
FIG. 4 is a flowchart of an example process that may be carried out to determine a time zone based on mobile country code (MCC) information.

As shown in FIG. 4, the determination of time zone information based on MCC information (block 302) begins when the MS 102 determines its MCC based on MS 102 registration to the PLMN 106 (block 402). When the MS 102 registers to the PLMN 106, the MS 102 learns its MCC and it can report the MCC to the time server 104. In case the MS 102 is registered to more than one MCC (e.g., situations in which the MS 102 is background camped on VPLMN on a cellular network and registered on a HPLMN over Generic Access Network (e.g., WiFi)), then the MS 102 selects the MCC which is best suited for its time zone determination. There may be scenarios in which the MS 102 selects the MCC of a non-registered PLMN for time zone determination. One example for these scenarios is that MS 102 is in a region where it is not subscribed to register on cellular VPLMN and it registers to HPLMN over generic access networks (e.g., WiFi) and for time zone determination it uses the MCC of the VPLMN. For example, it is possible for the MS 102 to monitor messages transmitted from the communication network outside of messages used to register the MS 102. For example, PLMN ID, MCC, and LAI/RAI/TAI information is available through network broadcast messages. Thus, registration messages and non-registration messages may be used by the MS 102 to determine the time of the MS 102.

As shown in FIG. 1, the time server 104 maintains the MCC to country/time zone database 140. Using this database 140, the time server 104 maps the MCC to the country (block 404). The time server 104 then determines whether the identified country contains single time zone or spans multiple time zones (block 406). If the country has only one time zone (block 106), then the time server 104 calculates and returns the correct time for the MS by combining universal time and daylight saving settings for that country (block 408). Alternatively, the time server 104 may return the time zone offset to the MS 102 (block 408), which then uses the time zone offset to calculate local time. However, if the identified country corresponding to the MCC is a country in which several time zones exists (e.g., US, Canada, Australia, Russia) (block 406), the process 302 returns a failure (block 410) to the process 300, which determines that a failure occurred at block 304.

Figure 5:
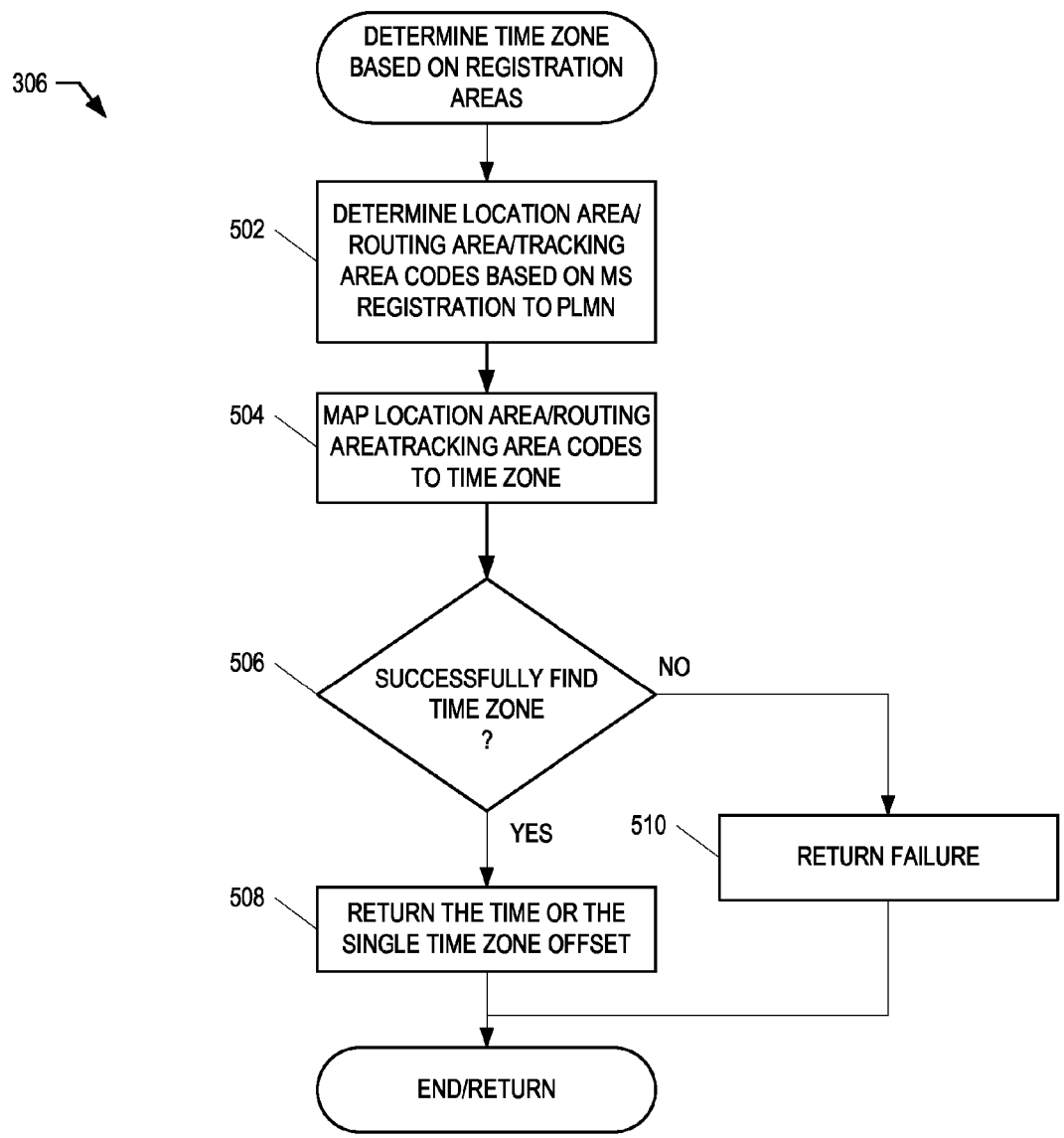
FIG. 5 is a flowchart of an example process that may be carried out to determine a time zone based on registration area information.

If determining the time zone based on MCC information failed (block 304), the process 300 attempts to determine time zone information based on registration area information, as shown in the example of FIG. 5. The MS 102 first determines its LAI/RAI/TAI codes based on its prior registration to the PLMN 106 (block 502) and passes this information to the time server 104. The time server 104, then maps the LAI/RAI/TAI information to a time zone (block 504). As explained above, the time server 104 maintains a data base 142 where location/routing/tracking area codes for all PLMNs are maintained with corresponding time zone information where MCC is unable to resolve the time zone and PLMN does not support NITZ. The trigger for the information exchange between MS and time server for this step could be change in location/routing/tracking area, power on, radio cycle etc. If time server database contains the correct time zone for the location/routing/tracking area identity of the MS 102 (block 506), the process 306 ends with correct time or time zone conveyed to the MS (block 508). However, if time server lacks information for the relevant area, a failure is returned (block 510).

Figure 6:
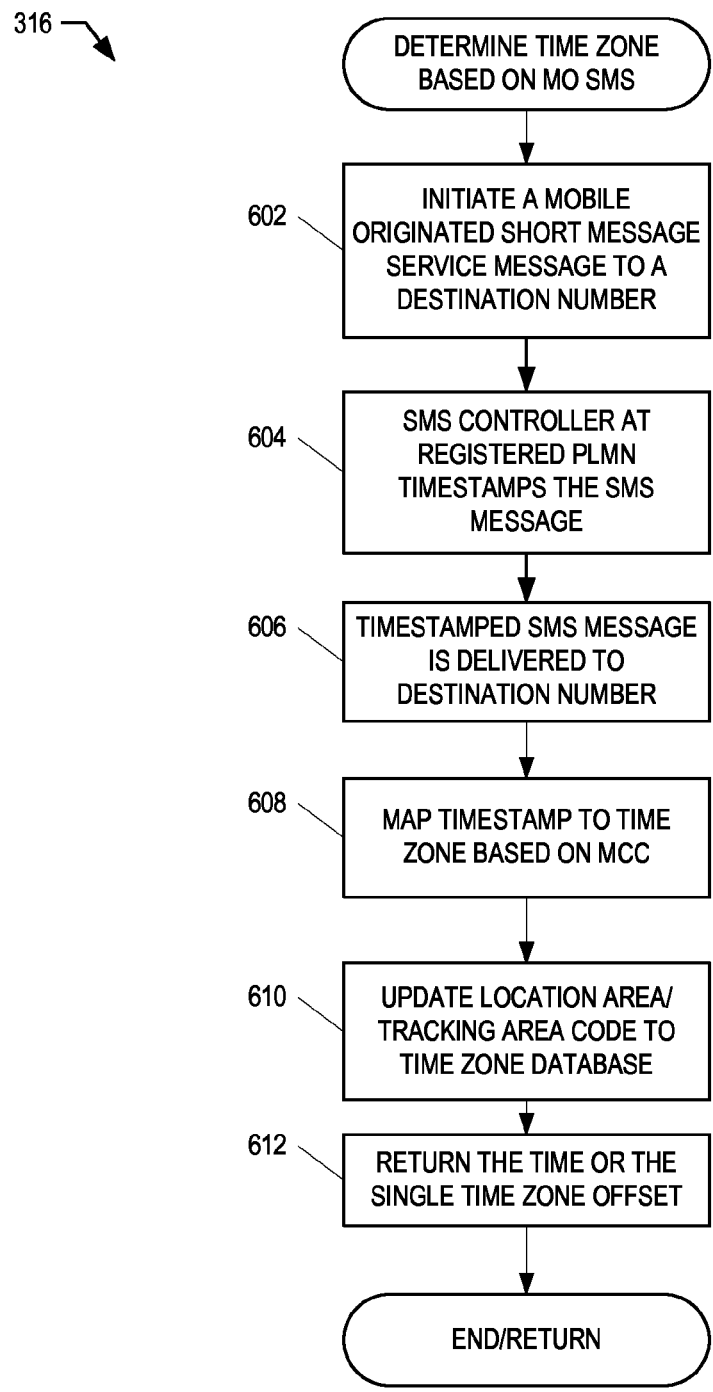
FIG. 6 is a flowchart of an example process that may be carried out to determine a time zone based on a mobile originated (MO) short message service (SMS) message.

The failure returned at block 510 causes the process 300 to progress to selecting between two determinations (block 316 or 318). If block 316 is selected, the process determines the time zone based on a SMS originated from the MS 102. One particular, example implementation of this is shown in FIG. 6, which begins by the MS 102 initiating an SMS message to a destination number (block 602). The destination number could be predefined in the MS 102 or passed to MS 102 through any transport method. An SMS controller (SC) at the registered PLMN (i.e. the PLMN 106 where MS 102 is registered) time stamps the SMS (block 604). The time stamping is done by the SM-TL (Short Message Transfer Layer) at the SC. The SMS contains mandatory time stamp in the form of Service Centre Time Stamp (SCTS). The SMS is delivered to the time server 104 (block 606). This SMS is delivered to the time server 104 or by any other application or entity which maps it to the correct zone for the related MCC. The time server 104 reads the time stamps and maps it to the correct zone for the related MCC (block 608).

After the mapping is complete (block 608), the database processor 130 updates the LA/RA/TA to time zone database 142 (block 610). This helps not only in setting the correct time to the MS 104 but also populating and updating the location area to time zone database 142 maintained by the time server. The need to send SMS by the MS 102 to find time zone is per Location Area/tracking area and not per MS. Thus, only one SMS needs to be sent by the MS 102 per location area/tracking area if the LAI/RAI/TAI to time zone database 142 lacks LAC/TAC to time zone mappings. Once it has the correct mapping, then it reuses it to convey time zone to other MS requests from the same LA/TA. The choice of using MO SMS helps in Home as well as visited PLMN scenarios.

The correct time or time zone is returned from the time server 104 to the MS 102 (block 612).

It is possible that carrier restructures its LAI/RAI/TAI, moves them around, or reassigns existing codes to LAI/RAI/TAI in another time zone. In this case, the time server database will have stale information. To avoid stale information being used in setting time zone to MS, there could be time to live (TTL) associated with every database entry. When a new entry is created its TTL is set to an implementation specific maximum TTL by the time server. During this period any requests for the LAI/RAI/TAI are serviced from the database entry. Once this time expires, time server deletes the record from the time zone database. This triggers a SMS to be sent once a MS from the respective LAI/RAI/TAI requires time zone information. All of this functionality may be implemented and carried out by the database processor 130 of FIG. 1.

Alternatives to SMS (e.g. MMS) can also be used by the time server 104 to populate and update its database 142.

Figure 7:
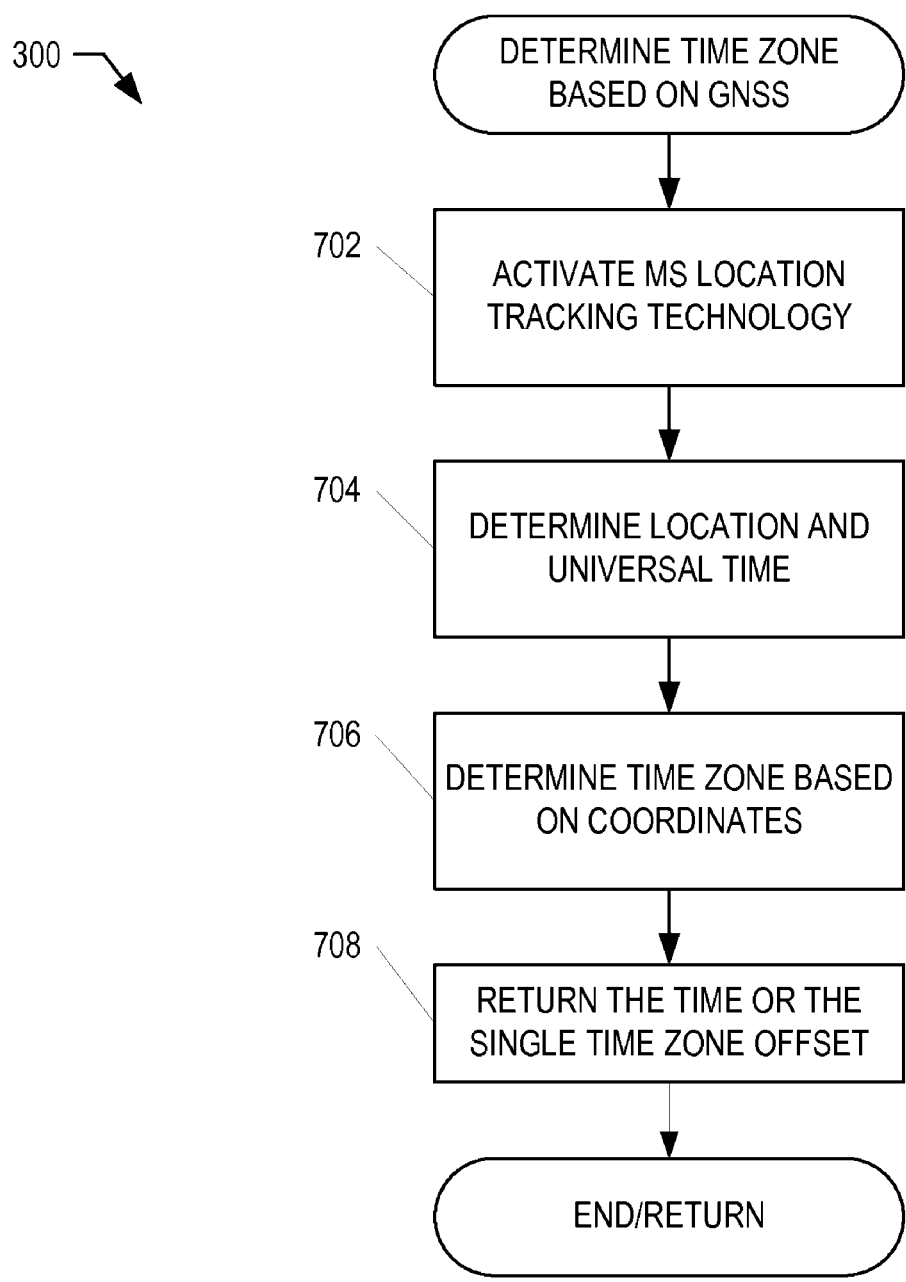
FIG. 7 is a flowchart of an example process that may be carried out to determine a time zone based on global navigation satellite system (GNSS) information.

Alternatively, if the selection (block 314) indicates the use of GNSS, a process such as the process 318 of FIG. 7 is used. The process 318 is similar to the process described above in conjunction with FIG. 2. In one example, the process 318 activates the MS 102 location tracking technology (e.g., GNSS) (block 702). The MS 102 then determines its location (e.g., coordinates) and universal time using the tracking technology (block 704). The coordinates are then used by the time server 104, the MS 102, or any other suitable entity to determine a time zone (e.g., a local time zone) based on the coordinates (block 706). In one example, the time server 104 may use a coordinate to time zone database 144 to determine the time zone of the MS 102. After the time zone is determined, either the time or the time zone is returned to the MS 102 (block 708).

The MS 102 can also use GNSS technologies to find time zone of the camped LAI/RAI/TAI. When time server registry could not provide the time zone information for a particular LAI/RAI/TAI then MS could be instructed to consult GNSS to determine its coordinates. In situations when MS is equipped with GNSS (like GPS) and line of sight is available with the satellites then MS determines its coordinates and pass them on the timer server to map them to time zone or do the mapping locally at the MS.

Figure 8:
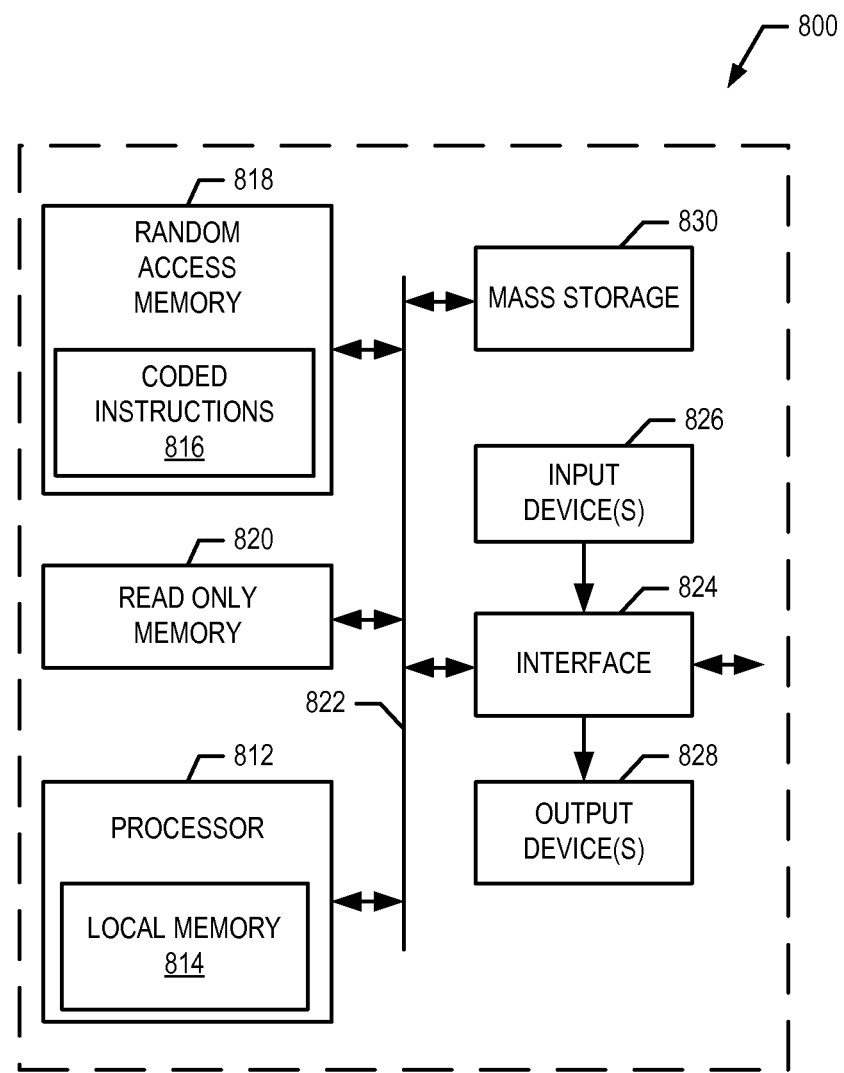
FIG. 8 is a block diagram of an example processing system capable of implementing the apparatus and methods disclosed herein.

FIG. 8 is a block diagram of an example processing system 800 capable of implementing the apparatus and methods disclosed herein. The processing system 800 can correspond to, for example, a mobile station processing platform, a network element processing platform, a server, a personal computer, a personal digital assistant (PDA), an Internet appliance, a mobile phone, or any other type of computing device. For example the processing system 800 may implement the UE 102 and any component of the mobile communication networks 104.

The system 800 of the instant example includes a processor 812 such as a general purpose programmable processor, an embedded processor, a microcontroller, etc. The processor 812 includes a local memory 814, and executes coded instructions 816 present in the local memory 814 and/or in another memory device. The processor 812 may execute, among other things, machine readable instructions to implement the processes represented in the drawings described above. The processor 812 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 812 is in communication with a main memory including a volatile memory 818 and a non-volatile memory 820 via a bus 822. The volatile memory 288 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the system 800 also includes one or more mass storage devices 830 for storing software and data.

Examples of such mass storage devices 830 include floppy disk drives, hard drive disks, compact disk drives and digital versatile disk (DVD) drives.

As an alternative to implementing the methods and/or apparatus described herein in a system such as the device of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of this disclosure.

What is claimed is:

1. A method for use in a device comprising:
    transmitting a messaging service message to a server via a communication network, the messaging service message to be used by the server to determine a time zone for the device; and
    after transmitting the messaging service message, receiving the time zone for the device from the server.

2. The method of claim 1, further comprising using the time zone to provide a local time to applications operable on the device, wherein the applications operable on the device comprise one or more of calendar functionality, task lists, call logs, event logs, instant messaging, social networking, electronic mail, or short message service time stamping.

3. The method of claim 1, further comprising receiving daylight savings information for the time zone.

4. The method of claim 1, wherein transmitting the messaging service message is in response to the server failing to determine the time zone for the device based on registration area information.

5. The method of claim 4, wherein the registration area information comprises one or more of location area identity, routing area identity, or tracking area identity information.

6. The method of claim 1, wherein the messaging service message is a short message service message.

7. The method of claim 1, wherein receiving the time zone is based on an evaluation of the messaging service message by the server when an evaluation of a mobile country code does not provide the time zone.

8. The method of claim 1, wherein transmitting the messaging service message is based on determining that the communication network does not provide time information to the device.

9. The method of claim 1, wherein the received time zone for the device is determined by the server based on evaluating a timestamp applied to the messaging service message after the transmission of the messaging service message from the device.

10. A mobile device, comprising:
    a processor; and
    a memory storing instructions which, when executed by the processor, cause the processor to:
        transmit a messaging service message to a server via a communication network, the messaging service message to be used by the server to determine a time zone for the device; and
        after transmitting the messaging service message, receive the time zone for the device from the server.

11. A mobile device as defined in claim 10, wherein the instructions cause the processor to transmit the messaging service message in response to the server failing to determine the time zone for the device based on registration information.

12. A mobile device as defined in claim 10, wherein the received time zone for the device is determined by the server based on evaluating a timestamp applied to the messaging service message after the transmission of the messaging service message from the device.

13. A tangible computer readable storage device comprising machine readable instructions which, when executed, cause a processor to:
    transmit a messaging service message to a server via a communication network, the messaging service message to be used by the server to determine a time zone for a device; and
    determine a local time for the device based on receiving, subsequent to transmitting the messaging service message, the time zone for the device from the server.

14. The storage device of claim 13, wherein the instructions further cause the processor to provide the local time to applications operable on the device, wherein the applications operable on the device comprise one or more of calendar functionality, task lists, call logs, event logs, instant messaging, social networking, electronic mail, or short message service time stamping.

15. The storage device of claim 13, wherein the instructions further cause the processor to determine the local time based on receiving daylight savings information for the time zone.

16. The storage device of claim 13, wherein the instructions are to cause the processor to transmit the messaging service message in response to the server failing to determine the time zone for the device based on registration area information.

17. The storage device of claim 16, wherein the registration area information comprises one or more of location area identity, routing area identity, or tracking area identity information.

18. The storage device of claim 13, wherein the messaging service message is a short message service message.

19. The storage device of claim 13, wherein the received time zone for the device is determined by the server based on evaluating a timestamp applied to the messaging service message after the transmission of the messaging service message.

20. A mobile device, comprising:
    an SMS message originator to transmit a messaging service message to a server via a communication network, the messaging service message to be used by the server to determine a time zone for a device; and
    a time information processor to receive the time zone for the device from the server subsequent to the SMS message originator transmitting the messaging service message.

21. The mobile device of claim 20, wherein the received time zone for the device is determined by the server based on evaluating a timestamp applied to the messaging service message after the transmission of the messaging service message from the device by the SMS message originator.

* * * * *